(12) United States Patent
Kamibeppu

(10) Patent No.: US 11,166,150 B2
(45) Date of Patent: Nov. 2, 2021

(54) RADIO COMMUNICATION EQUIPMENT AND CONTROL METHOD THEREOF

(71) Applicant: KYOCERA Corporation, Kyoto (JP)

(72) Inventor: Shinichi Kamibeppu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/548,353

(22) Filed: Aug. 22, 2019

(65) Prior Publication Data

US 2019/0380023 A1 Dec. 12, 2019

Related U.S. Application Data

(63) Continuation of application No. PCT/JP2018/006520, filed on Feb. 22, 2018.

(30) Foreign Application Priority Data

Feb. 24, 2017 (JP) .............................. JP2017-032957

(51) Int. Cl.
| | |
|---|---|
| *H04W 12/08* | (2021.01) |
| *H04W 8/18* | (2009.01) |
| *H04W 4/44* | (2018.01) |
| *H04W 76/11* | (2018.01) |
| *H04W 8/26* | (2009.01) |

(52) U.S. Cl.
CPC ............ *H04W 8/183* (2013.01); *H04W 4/44* (2018.02); *H04W 8/26* (2013.01); *H04W 76/11* (2018.02)

(58) Field of Classification Search
CPC ........... H04W 4/44; H04W 4/04; H04W 4/30; H04W 76/11; H04W 76/15; H04W 76/10; H04W 76/12; H04W 76/14; H04W 8/183; H04W 8/18; H04W 8/20; H04W 8/22
USPC .......................................................... 370/329
See application file for complete search history.

(56) References Cited

U.S. PATENT DOCUMENTS

| | | | | |
|---|---|---|---|---|
| 5,903,832 | A * | 5/1999 | Seppanen | H04W 48/18 455/435.3 |
| 2006/0183500 | A1 | 8/2006 | Choi | |
| 2006/0293036 | A1 | 12/2006 | Zhou | |
| 2008/0020761 | A1 | 1/2008 | Park | |
| 2010/0317420 | A1 * | 12/2010 | Hoffberg | G07F 17/323 463/1 |
| 2011/0117904 | A1 * | 5/2011 | Lewis | H04W 12/06 455/422.1 |

(Continued)

FOREIGN PATENT DOCUMENTS

| | | |
|---|---|---|
| JP | 2000-509568 A | 7/2000 |
| JP | 2005-520422 A | 7/2005 |

(Continued)

*Primary Examiner* — Phong La

(74) *Attorney, Agent, or Firm* — Studebaker & Brackett PC

(57) ABSTRACT

A radio communication equipment installed on a vehicle comprises a radio communicator configured to perform radio communication with a base station, an information card configured to store a country code representing a region and an operator code of a network operator, and a controller configured to determine whether a service of the network operator is available, based on a country code and an operator code acquired from the base station and the country code and the operator code stored in the information card, and notify a user of information indicating whether the service is available.

7 Claims, 4 Drawing Sheets

(56) References Cited

U.S. PATENT DOCUMENTS

| | | | |
|---|---|---|---|
| 2012/0309374 A1* | 12/2012 | Tagg | H04L 61/6054 |
| | | | 455/418 |
| 2013/0072257 A1* | 3/2013 | Evans | G06F 16/2455 |
| | | | 455/558 |
| 2013/0137405 A1* | 5/2013 | Kirik | H04W 8/183 |
| | | | 455/414.1 |
| 2013/0159021 A1* | 6/2013 | Felsher | G16H 10/60 |
| | | | 705/3 |
| 2014/0228023 A1 | 8/2014 | Komiya | |
| 2015/0215766 A1* | 7/2015 | Russell | H04W 8/18 |
| | | | 455/433 |
| 2016/0014824 A1* | 1/2016 | Xiang | H04W 16/10 |
| | | | 370/329 |
| 2016/0292929 A1* | 10/2016 | Konks | G06Q 20/145 |
| 2017/0063754 A1* | 3/2017 | Kirschbaum | H04L 51/32 |
| 2017/0064601 A1* | 3/2017 | Kubota | H04W 74/00 |
| 2017/0195483 A1* | 7/2017 | Gault | H04M 7/0066 |
| 2018/0014239 A1* | 1/2018 | Chau | H04W 48/18 |
| 2018/0192363 A1* | 7/2018 | Holma | H04W 48/18 |
| 2018/0288105 A1* | 10/2018 | Iyer | H04L 65/1006 |
| 2019/0200233 A1* | 6/2019 | He | H04L 63/1466 |
| 2019/0357124 A1* | 11/2019 | Jia | H04W 8/18 |
| 2020/0244814 A1* | 7/2020 | Sharma | G06Q 30/0201 |

FOREIGN PATENT DOCUMENTS

| | | |
|---|---|---|
| JP | 2006-067509 A | 3/2006 |
| JP | 2008-244513 A | 10/2008 |
| JP | 2016-111409 A | 6/2016 |
| WO | 97/37506 A1 | 10/1997 |

* cited by examiner

RADIO COMMUNICATION EQUIPMENT AND CONTROL METHOD THEREOF

RELATED APPLICATIONS

The present application is a continuation based on PCT Application No. PCT/JP2018/006520, filed on Feb. 22, 2018, which claims the benefit of Japanese Patent Application No. 2017-032957 (filed on Feb. 24, 2017). The content of which is incorporated by reference herein in their entirety.

TECHNICAL FIELD

The present discloser relates to a radio communication equipment including an information card such as a SIM card and a control method thereof.

BACKGROUND ART

In a radio communication module compliant with the 3rd generation partnership project (3GPP), a subscriber identity module (SIM) card or a user identity module (UIM) card (hereinafter collectively referred to simply as "SIM card") provided by a communication company (also referred to as an operator or a communication common carrier). The SIM card is an IC card in which subscriber (user) information of the radio communication module and a contracted service are stored. The user can use the communication equipment in which the SIM card is attached, and the contracted service is available (see, for example, Patent Literature 1).

At present, in addition to the SIM card described above, a built-in SIM called an embedded SIM (eSIM) is in widespread use. Unlike the removable SIM card, the eSIM is a non-removable chip SIM that is mounted in advance on an internal circuit board or the like. The eSIM has the advantage of being able to rewrite the contract contents with the communication company via communication and does not require replacement work as in the SIM card.

The radio communication module mounting a SIM card or an eSIM may query a dedicated server on the network with the information of the SIM card when the radio communication module checks whether or not the service of the communication company is available. Whether or not the service of the communication company is available is notified to the radio communication module via a short message service (SMS). Alternatively, when the radio communication module receives the SMS, the information of the SIM card of the radio communication module is rewritten, and the service of the communication company becomes available.

SUMMARY

A radio communication equipment installed on a vehicle comprises a radio communicator configured to perform radio communication with a base station, an information card configured to store a country code representing a region and an operator code of a network operator, and a controller configured to determine whether a service of the network operator is available, based on a country code and an operator code acquired from the base station and the country code and the operator code stored in the information card, and notify a user of information indicating whether the service is available.

DESCRIPTION OF THE EMBODIMENT

The present discloser provides a radio communication equipment, with a simple configuration, capable of determining whether or not the service of the communication company can be available when using the service of the communication company and a control method thereof.

Hereinafter, the present embodiment will be described in detail with reference to the attached drawings.

Figure 1:
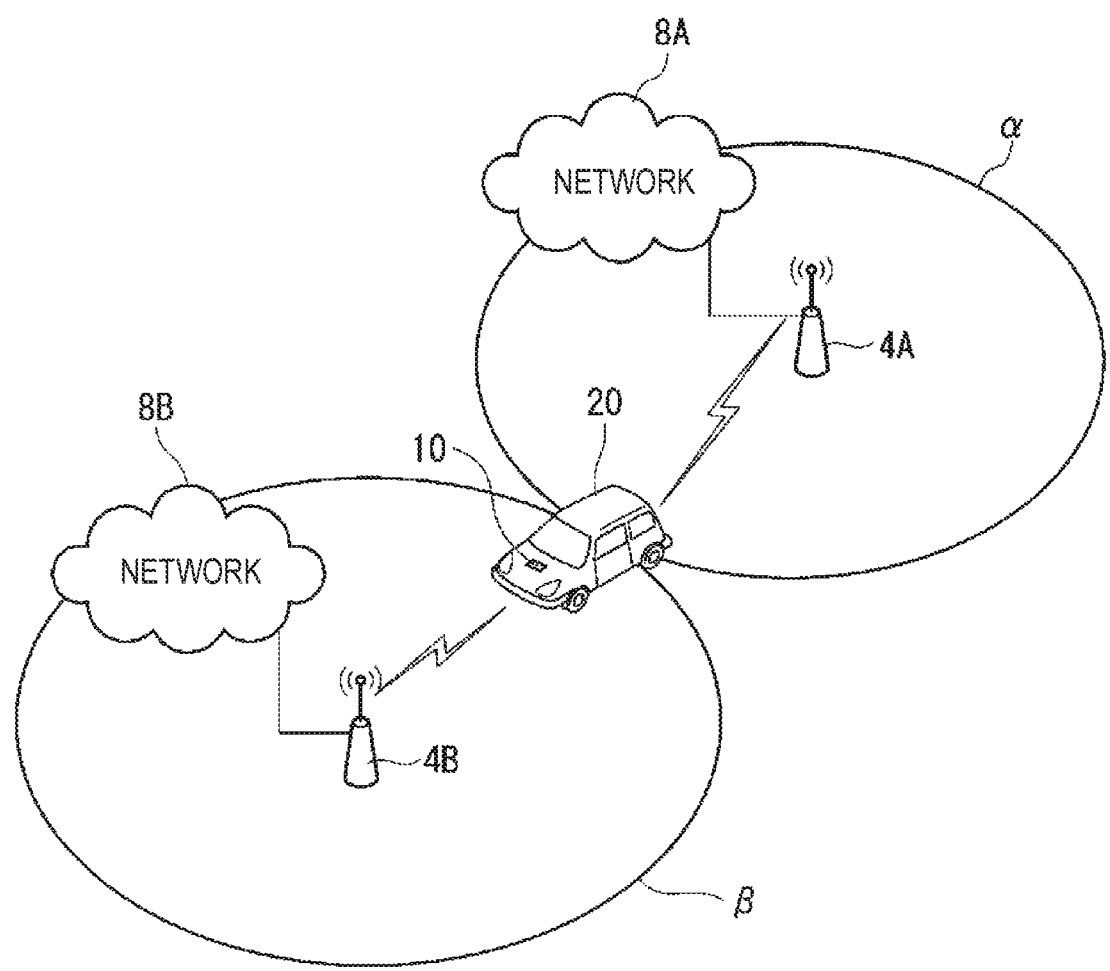
FIG. 1 illustrates an example of a radio communication system including a radio communication module according to a present embodiment.

FIG. 1 illustrates an example of a radio communication system including a radio communication module 10 according to the present embodiment. FIG. 1 illustrates a case where services by different communication companies are deployed in a country α and a country β. Specifically, in the country α, a communication company A establishes a base station 4A and provides a radio network 104A. Further, in the country β, a communication company B establishes a base station 4B and provides a radio network 108B. The radio communication module 10 of the present embodiment is assumed to be mounted on a vehicle 20.

Each communication company provides the user who has contracted with the communication company with the service of the communication company through the radio network.

The base station 4A, the base station 4B, the network 8A, and the network 8B are provided by a communication carrier A. Hereinafter, when the base station 4 or the network 8 is not distinguished for description, the base station 4 or the network 8 is simply described, whereas when the base station 4 or the network 8 is distinguished for description, the base stations 4A and 4B, or the networks 8A and 8B are described.

Figure 2:
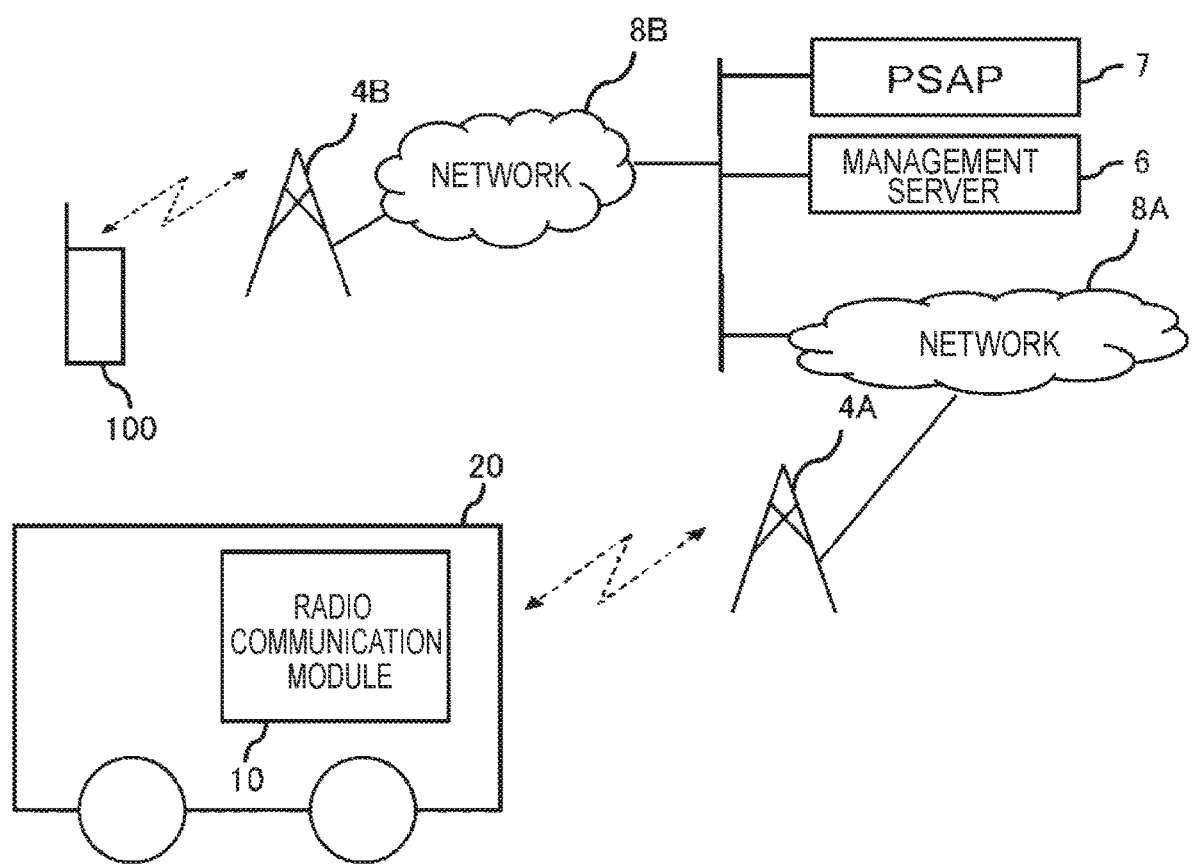
FIG. 2 is a configuration diagram of the radio communication system according to the present embodiment.

FIG. 2 is a configuration diagram of the radio communication system according to the present embodiment. The radio communication system illustrated in FIG. 2 includes the vehicle 20 equipped with the radio communication module 10, the base station 4A, the base station 4B, a network 8A, a network 8B, a radio terminal 100, a management server 6, and a PSAP 7. The PSAP is an abbreviation of a public safety answering point.

The base station 4 may cope with any mobile telecommunications systems, including second-generation mobile telecommunications systems, such as global system for mobile communications (GSM) (registered trademark), third-generation mobile telecommunications systems, such as code division multiple access (CDMA), or fourth-generation mobile telecommunications systems, such as long term evolution (LTE). The management server 6 may manage information of a user and information of the network 8.

The radio communication module 10 implements various functions. For example, in the implementation of an emergency call system, the radio communication module 10 originates to the PSAP 7 (including an emergency call center) in an emergency. There are known telematics services that provide information services real time in combination of the vehicle 20 with a communication system. In the telematics services, map data and point of interest (POI) data for data updates of a navigation system from a server on the network 8. In the telematics services, diagnostic information on the equipments installed on the vehicle is uploaded to the server on the network 8. The radio communication module 10 performs such downloads and uploads via the network 8.

In the embodiment, the radio communication module 10 is instantiated a radio communication module installed on a vehicle, such as the vehicle 20. In the embodiment, the vehicle 20 is described as an example of a vehicle. Of course, the vehicle may be any moving transportation, such as ships or trains. The radio communication module 10 also may be installed on portable terminals, such as cellular telephones or smartphones. The radio communication module 10 may be a module for internet of things (IoT).

The radio communication module 10 may cope with second-generation mobile telecommunications systems, third-generation mobile telecommunications systems, or fourth-generation mobile telecommunications systems. The radio communication module 10 may communicate with the radio terminal 100. The radio communication module 10 may have various functions and functions that execute programs created by a user.

Figure 3:
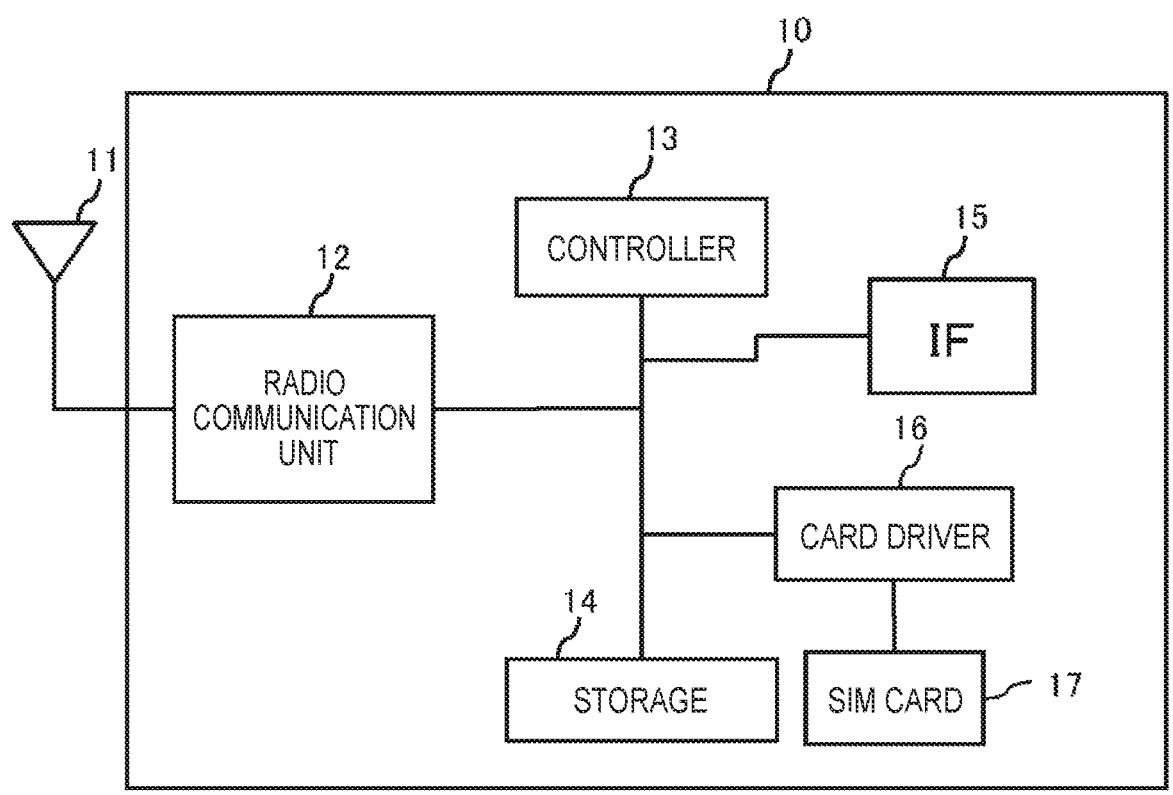
FIG. 3 is a schematic internal block diagram of the radio communication module according to the present embodiment.

FIG. 3 is a block diagram of the radio communication module according to the embodiment. The radio communication module illustrated in FIG. 3 has an antenna 11, a radio communicator 12, a controller 13, a storage 14, an IF 15, a card driver 16, and a subscriber identity module (SIM) card 17.

The antenna 11 transmits and receives radio signals with the base station 4.

The radio communicator 12 communicates with the base station 4 by radio communication through the antenna 11. The radio communicator 12 has an analog signal processor and a digital signal processor.

The analog signal processor performs amplification, an analog-to-digital conversion process, and any other process of radio signals received from the antenna 11, performs analog amplification, including a digital-to-analog conversion process, of the digital signals transferred from the digital signal processor, and transmits the analog signals through the antenna 11.

The digital signal processor encodes data transferred from the controller 13, and converts the data into digital signals such that the data can be transmitted through the communication channel of radio signals, whereas the digital signal processor decodes the digital signals transferred from the analog signal processor, and transfers the decoded data to the controller 13.

The controller 13 is mainly configured of a microcomputer formed of a digital signal processor (DSP), a central processing unit (CPU) that executes various programs, a read only memory (ROM), a random access memory (RAM), a backup RAM, an input/output (I/O), and any other component (none of them are illustrated in the drawings), and executes various control programs stored on the ROM to execute various processes. The controller 13 executes processes necessary to control the radio communicator 12.

The storage 14 is configured of an electronically erasable and programmable read only memory (EEPROM) that can electrically rewrite the content, for example, and the storage 14 stores programs and information necessary to control the radio communicator 12.

An IF 15 is a USB IF or another IF, and is connected to a display, a microphone and a speaker, or a navigation system. The IF 15 is also an interface for making a notification of or displaying information notified to the user, and such information is notified or/and displayed via the IF 15 by a display, a microphone, a speaker or the like. A controller 13 can notify the user of information indicating whether or not the service of the communication company is available via the IF 15.

The card driver 16 drives an IC card referred to as a SIM card (or a UIM card), i.e., an information card. The card driver 16 may accept and reject the SIM card 17. In the case in which the card driver 16 is instructed to read or write configuration information by the controller 13, the card driver 16 reads configuration information recorded on the SIM card 17, and writes configuration information on the SIM card 17.

Generally, the SIM card is an IC card recording information that identifies a subscriber, communication carrier identification information that identifies a communication carrier, and information on services usable by the subscriber in contract, and any other information.

The SIM card 17 may be an embedded eSIM (embedded SIM). The SIM card 17 may be disposed on the outside of the radio communication module 10. The SIM card 17 may be supplied by the communication carrier, or may be obtained through other means. The user mounts or connects the supplied SIM card 17 to the radio communication module 10 to use the radio communication module 10.

The SIM card stores configuration information necessary for receiving a service, such as information for identifying a user. For example, the SIM card has a home network ID of a contracting communication company. The home network ID may be a home public land mobile network (HPLMN) that is included in an international mobile subscriber identity (IMSI).

A public land mobile network (PLMN) includes a country code (mobile country code: MCC) and a company code (mobile network code: MNC). The country code is not limited to the country but may be a region. Even one country may have multiple country codes.

As the home network ID, a plurality of PLMNs (country code+company code) included in an equivalent public land mobile network (EHPLMN) list, which is a network equivalent to the HPLMN to be the contracted network, may be used.

The controller 13 (network information management unit) manages information of the radio network to which the radio communication module 10 is connected. The controller 13 acquires, for example, the country code and the company code broadcast from a base station 4 at the current location via a radio communication unit 12.

The base station 4 has a channel for broadcasting predetermined control information (BCCH: broadcasting control channel) to mobile stations in the area. When information including the country code and the company code is broadcast from the BCCH, the controller 13 can acquire the country code and the company code.

A storage unit 14 (information management unit) stores a home network ID recorded in a SIM card 17. For example, when the SIM card 17 is attached or the power of the radio communication module 10 is turned on, the home network ID recorded in the SIM card 17 is stored in the storage unit 14.

Before describing the functions of the radio communication module 10 of the present embodiment, two situations of the radio communication module 10 will be described.

The first situation is, for example, the case where the vehicle 20 is manufactured in the country α and is about to be exported to the country β. Since the vehicle 20 is scheduled to operate in the country β, the setting of the home network ID of the SIM card 17 in the country α is such that the country code is for the country β and the company code is for the communication company B. Therefore, it may be appropriate that the radio communication module 10 can not use the radio network 104A of the communication company A even if the power is turned on in the country α before export.

The second situation is, for example, the case where the radio communication module 10 of the vehicle 20 in the country α moves to the country β when receiving or being scheduled to receive the service of the communication company A. In such a case, the setting of the home network ID of the SIM card 17 is such that in the country α, the country code is for country β, and the company code is for the communication company A. At this time, it may be appropriate that the radio communication module 10 can not use the service even if the vehicle 20 moves to the country β and shifts to the area of the communication company B.

Assuming the above two situations, the radio communication module 10 of this embodiment has a function that does not perform an unnecessary signal transmission within the area of the communication company where it is not available, and a function of notifying the user without performing communication processing such as the SMS that the radio communication module 10 is within the area of the communication company where it is not available. Hereinafter, after explaining the components of the radio communication module 10, the process which each component performs is demonstrated.

Figure 4:
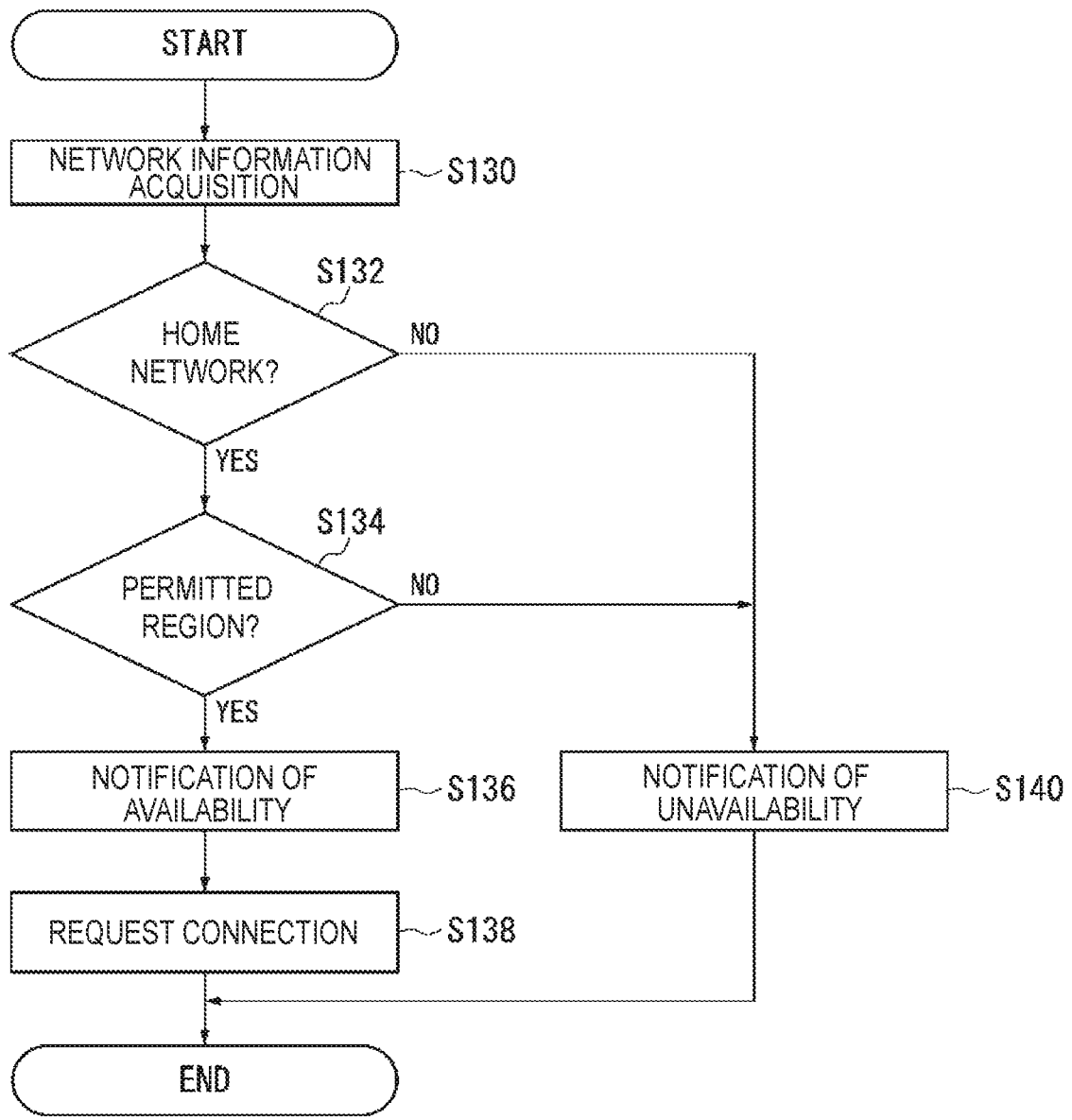
FIG. 4 is a flowchart illustrating a process performed by the radio communication module according to the present embodiment.

FIG. 4 is a flowchart illustrating the process performed by the radio communication module 10. The process of the radio communication module 10 will be described below with reference to the flowchart of FIG. 4. This flowchart may be executed when the information recorded on the SIM card 17 is updated. Also, this flowchart may be executed when the radio communication module 10 is activated by the SIM card 17.

First, the controller 13 acquires, as network information, the country code and the company code broadcast from the base station 4 at the current location via the BCCH or the like (step S130). Hereinafter, the controller 13 determines whether the service of the communication company is available based on the acquired country code and company code, and the country code and the company code recorded in the SIM card 17.

Next, the controller 13 compares the acquired company code with the home network ID (for example, the company code of the HPLMN) stored in the storage unit 14 to determine whether or not a radio network provided by the base station 4 at the current location a home network (step S132). The controller 13 may compare the company code acquired from the base station 4 with the home network ID (for example, the company code of the HPLMN) recorded in the SIM card 17.

Also, the company code of the home network ID may use a plurality of PLMNs (country code and company code) stored in the EHPLMN list stored in the SIM 17. The controller 13 may compare each of the country codes and the company codes in this list with the country code and the company code acquired from the base station to determine whether the service of the communication company is available.

When the radio network is the home network in step S132 (YES in step S132), the controller 13 compares the country code acquired from the base station 4 with the home network ID stored in the storage unit 14 (for example, the country code of the HPLMN) to determine whether or not it is a country or region where the use of the SIM card 17 is permitted (hereinafter referred to as a permitted region) in subsequent step S134. The controller 13 may compare the country code acquired from the base station 4 with the home network ID (for example, the country code of the HPLMN) recorded in the SIM card 17.

In the case of the permitted region (YES in step S134), the controller 13 notifies the user of information indicating that the radio network is available through the IF 15 (step S136). Thereafter, the controller 13 makes a connection request to the base station 4 automatically or in response to a user operation (step S138), or may make the connection request.

In the first and second situations described above, the case where step S136 is performed will be described below.

In the first situation described above, in country α, the country code is updated for country β, and the company code is updated for communication company B of the home network ID of the SIM card 17. Then, the radio communication module 10 moves to the country β. This flowchart is executed in the country β.

In the second situation described above, it is assumed that, in the country α, the country code is for country β and the company code is for communication company A of the home network ID of the SIM card 17. Then, the radio communication module 10 moves to the country β. The setting of the company code of the SIM card 17 is updated from for the communication company A to for the communication company B. This flowchart is executed in the country β.

Although two situations have been described, other situations are also probable. After the radio communication module 10 moves to the country β, with respect to the setting of the home network ID of the SIM card 17, the country code may be updated for the country β and the company code may be updated for the communication company B.

When the controller 13 determines that the radio network is not the home network (NO in step S132), or when the controller 13 determines that the region where the SIM card 17 is used is not a permitted region (NO in step S134), the controller 13 notifies the user of information indicating that the radio network is unavailable (step S140).

The process described with reference to FIG. 4 may be started at the timing when the radio communication module 10 is powered on, or may be started at the timing when the recording of the SIM card 17 is rewritten.

Usually, the radio communication module mounting a SIM card or an eSIM may query a dedicated server on the network with the information of the SIM card when checking whether or not the service of the communication company is available. In this case, whether or not the service of the communication company is available is notified to the radio communication module via SMS.

However, for example, the radio communication module for an automobile may be used in various countries, so that it is not possible to use the SMS in some countries. To build a system that enables the SMS on all networks in each country is a heavy burden on communication companies and the like.

Therefore, the radio communication module 10 of the present embodiment does not communicate with the SMS or a server such as the management server 6, and can notify, with a simple configuration, the user of whether the service of the communication company can be available.

Since the information of the SIM card 17 is used, it is considered that there is an advantage in that the present discloser can be implemented by only the information that is usually used in the 3GPP specifications in addition to the country information of the sales destination of the vehicle 20. Since the country code and the company code of the home network ID of the SIM card 17 are confirmed to match, there is no need to make a request of the start of the use by the user with a parameter not expected by the network of the sales destination country.

The respective steps in the radio communication module 10 in the present specification do not necessarily have to be processed in chronological order according to the order described in the flowchart, and may include processing in parallel or by a subroutine.

INDUSTRIAL APPLICABILITY

According to the present discloser, it is possible to provide a radio communication equipment, with a simple configuration, capable of determining whether or not the service of the communication company can be available when using the service of the communication company and a control method thereof.

The invention claimed is:

1. A radio communication equipment installed on a vehicle comprising:
   an information card on which a country code representing a region and an operator code of a network operator are stored; and
   a processor and a memory coupled to the processor, the processor configured to:
     perform radio communication with a base station;
     drive the information card; and
     determine whether a service of the network operator is available, based on a country code and an operator code acquired from the base station and the country code and the operator code stored in the information card, and notify a user of information indicating whether the service is available, wherein
   the processor is configured to determine the service is unavailable when the operator code acquired from the base station and the operator code stored in the information card are matched and the country code acquired from the base station and the country code stored in the information card are not matched, and
   when determining that the service is unavailable, the processor is configured to notify the user of information indicating that the service is unavailable.

2. The radio communication equipment according to claim 1,
   wherein the information card is configured to store a list of country codes and operator codes, and
   the processor is configured to compare the country codes and the operator codes in the list with the country code and the operator code acquired from the base station and, determine whether the service of the network operator is available.

3. The radio communication equipment according to claim 1,
   wherein the information card is configured to store a home network ID of a contracting network operator, the home network ID including the country code and the operator code, and
   the processor is configured to compare the country code and the operator code in the home network ID with the country code and the operator code acquired from the base station and, determine whether the service of the network operator is available.

4. The radio communication equipment according to claim 1,
   wherein information of the information card is capable of being updated, and
   the processor is configured to determine whether the service of the network operator is available, based on the country code and the operator code acquired from the base station and the country code and the operator code stored in the information card when the information of the information card is updated.

5. A vehicle on which a radio communication equipment is installed, the radio communication equipment comprising:
   an information card on which a country code representing a region and an operator code of a network operator are stored; and
   a processor and a memory coupled to the processor, the processor configured to:
     perform radio communication with a base station;
     drive the information card; and
     determine whether a service of the network operator is available, based on a country code and an operator code acquired from the base station and the country code and the operator code stored in the information card, and notify a user of information indicating whether the service is available, wherein
   the processor is configured to determine the service is unavailable when the operator code acquired from the base station and the operator code stored in the information card are matched and the country code acquired from the base station and the country code stored in the information card are not matched, and
   when determining that the service is unavailable, the processor is configured to notify the user of information indicating that the service is unavailable.

6. A method of controlling a radio communication equipment installed on a vehicle, the radio communication equipment comprises
   an information card on which a country code representing a region and an operator code of a network operator are stored, the method comprising:
     performing radio communication with a base station;
     driving the information card; and
     determining whether a service of the network operator is available, based on a country code and an operator code acquired from the base station and the country code and the operator code in the information card, wherein
   the determining includes determining the service is unavailable when the operator code acquired from the base station and the operator code stored in the information card are matched and the country code acquired from the base station and the country code stored in the information card are not matched, and
   when determining that the service is unavailable, notifying a user of information indicating that the service is unavailable.

7. The radio communication equipment according to claim 1,
   wherein the processor is configured to determine whether the operator code acquired from the base station and the operator code stored in the information card are matched, and
   when determining that the operator code acquired from the base station and the operator code stored in the information card are matched, the processor is configured to determine whether the country code acquired from the base station and the country code stored in the information card are matched.

* * * * *